United States Patent [19]
Frank et al.

[11] Patent Number: 5,331,355
[45] Date of Patent: Jul. 19, 1994

[54] PLASTIC FRAME FOR EYEGLASSES

[75] Inventors: Kurt Frank, Schwäbisch Gmünd; Rolf Malthaner, Maulbronn-Schmie, both of Fed. Rep. of Germany

[73] Assignee: Optik Partner AG & Co., Schwabisch Gmünd, Fed. Rep. of Germany

[21] Appl. No.: 882,349

[22] Filed: May 13, 1992

[30] Foreign Application Priority Data

May 15, 1991 [DE] Fed. Rep. of Germany ....... 4115829

[51] Int. Cl.⁵ .............................................. G02C 13/00
[52] U.S. Cl. ...................................... 351/41; 351/83; 351/124
[58] Field of Search ........................... 351/41, 83, 124; 264/34, 35, 220, DIG. 64, DIG. 74

[56] References Cited

U.S. PATENT DOCUMENTS

Re. 26,237  7/1967  Rowland .
2,985,556   5/1961  Rowland .

FOREIGN PATENT DOCUMENTS 1225411   4/1965  Fed. Rep. of Germany .
2758617  12/1977  Fed. Rep. of Germany .
381397    4/1984  Fed. Rep. of Germany .
1356013   4/1963  France .
500708    2/1939  United Kingdom .................. 351/41
617084    2/1946  United Kingdom .

OTHER PUBLICATIONS

Manufacturing Optics International Plastics in Spectacles Manual, Jul. 1970, pp. 41, 43 and 44, 351, 41.

Primary Examiner—William L. Sikes
Assistant Examiner—Hung Xuan Dang
Attorney, Agent, or Firm—Robert W. Becker & Associates

[57] ABSTRACT

In a method for manufacturing plastic frames for eyeglasses a plastic blank is provided with formed portions in the area where protruding parts of the finished plastic frame are located. Preferably, these formed portions are injection molded onto the plastic blank. By providing these formed portions to the plastic blank, the number of commonly required cutting steps are reduced.

11 Claims, 3 Drawing Sheets

PLASTIC FRAME FOR EYEGLASSES

BACKGROUND OF THE INVENTION

The present invention relates to a plastic frame for eyeglasses, comprising a center portion, temples and hinges for connecting the temples to the center portion, whereby the plastic frame has protruding parts in the form of nose cushions at the center portion and hinge supports for the hinges at the center portion and the temples. The plastic frame is manufactured by cutting or machining the frame, respectively, its center portion and/or its temples from a plastic blank.

The present invention is further concerned with a method for manufacturing such plastic frames for eyeglasses.

Plastic frames for eyeglasses of the aforementioned kind are commonly manufactured from a flat plastic blank, having dimensions of approximately 60 by 180 mm and a thickness of, for example, 10 mm, by respective milling or cutting processes or other machining steps and thus shaped to the desired form. For such a manufacturing process it is necessary to provide the flat plastic blank with a thickness of up to 12 mm, because for high-quality plastic frames a one-piece manufacturing of the center piece is required, and the plastic blank thus must have a respective thickness in the area of the nose cushions or nose pads.

The temples of the plastic frame are usually manufactured from plastic blank material having a considerably reduced thickness with respect to the plastic blanks for the center portions of, for example, 4 mm.

It is a disadvantage of the known methods that the plastic blanks of a great thickness, which, for example, consist of cellulose acetate, are comparably expensive. The cutting or milling process is relatively time consuming, and, furthermore, a great amount of discard material is produced. Also, time periods between deliveries for plastic blanks of various sizes and colors vary, thus requiring uneconomical storage of various plastic blanks in order to ensure a continuous manufacture according to the demands of the market.

For plastic frames which do not have to conform to extremely high quality standards, it is possible to glue thin plastic plates to the area of the nose cushions so that for manufacturing the center portions plastic blanks with a reduced thickness may be employed. However, the manufacturing process is even further prolonged because after the application of the thin plastic plates the blanks must be carefully dried for an extended period of time.

The drying time must be determined in practice. It depends also to a certain degree on the form and thickness of the frame to be manufactured, respectively, on the nose cushion portion. The drying time must be selected such that a complete drying is ensured. If the drying time is insufficient, depressions may be observed within the area of the gluing scam which result from the fact that the gluing surface areas, i.e. the surface areas of the blank and of the plastic plates which are facing one another and which are provided with the glue, have been partially dissolved during pretreatment before the gluing step. If such depressions occur, the plastic frame is practically unfit to be sold and must be discarded.

It is therefore an object of the present invention to provide a plastic frame for eyeglasses of the aforementioned kind as well as a respective manufacturing method which ensure a high product quality with economical manufacturing costs and reduces storage costs while providing a great color and shape selection of the plastic frame.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
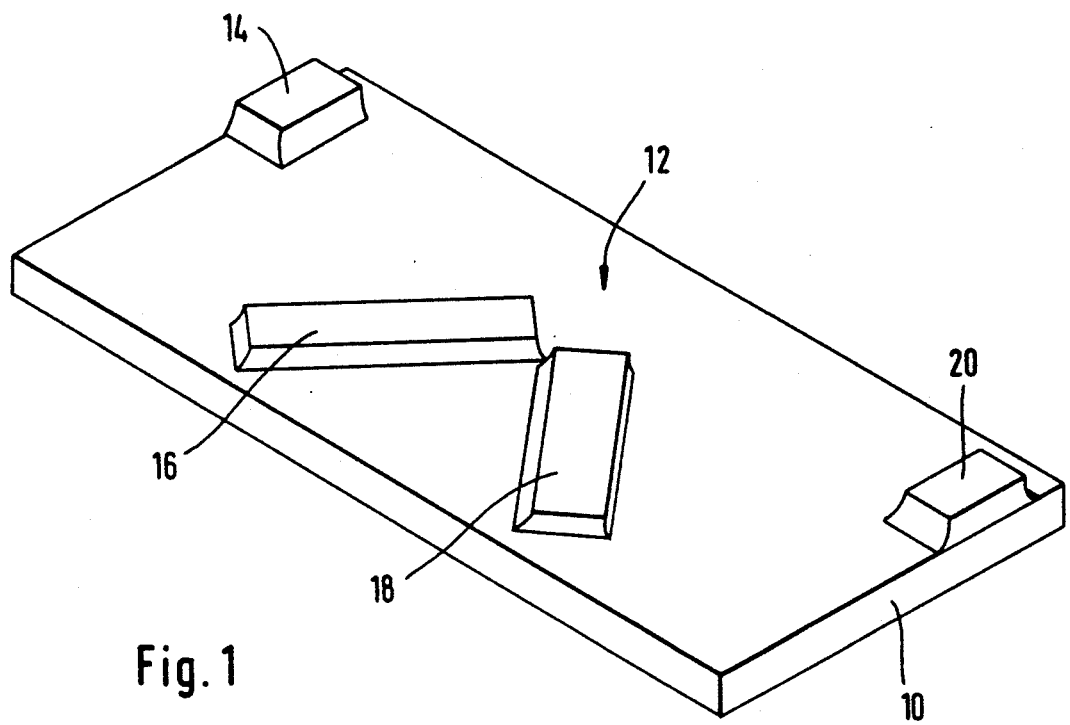
FIG. 1 is a perspective view of a plastic blank for manufacturing the inventive plastic frame, whereby formed portions are applied in the area of the nose cushions as well as in the area of the hinges.

The plastic frame for eyeglasses of the present invention is primarily characterized by comprising a center portion, temples and hinges for connecting the temples to the center portion, the plastic frame having protruding parts in the form of nose cushions at the center portion and hinge supports for the hinges at the center portion and the temples, whereby the plastic frame is manufactured by a process comprising the steps of: Cutting the center portion and/or the temples from a plastic blank; before the step of cutting, applying at least one formed portion of plastic material to the blank such that the formed portion exhibits an intimate connection to the blank; and finishing the blank together with the formed portion to form the center portion and/or the temples.

It is advantageous that the step of applying the formed portion further includes the step of positioning the formed portion so as to coincide with the protruding parts of the plastic frame. Preferably, the formed portion coincides with the nose cushion and with the hinge supports.

The step of applying the formed portion further includes the step of essentially homogeneously injection-molding the plastic material onto the blank. Injection-molding in this context does not refer to the classical process of injecting plastic material into a mold, but refers to the process of applying plastic material under heat and pressure onto a plastic substrate, i.e., the frame so that under the application conditions an intimate connection between the substrate and the applied material takes place. Of course, any other suitable application process may be employed.

With the inventive plastic frame it is provided that the blank is subjected to an application process, especially an injection-molding process, within the areas of protruding parts of the plastic frame, for example, within the area of the nose cushions or nose pads or within the area of the hinges. This results in a fast production of the plastic frame because the required cutting steps may be performed directly after the cooling and solidification of the plastic material applied to the blank.

The application process is selected such that an intimate connection between the plastic material applied, for example, in the form of a formed portion, and the blank is ensured. For example, it is possible to apply the identical plastic material which has been used for the manufacture of the plastic blank, especially cellulose acetate, in the injection molding process.

It is expedient to make the blank for the plastic material used for the temples, and providing the blank for the center portion with a thickness corresponding to the thickness of the plastic frame without the protruding parts.

This is especially advantageous because, due to the identical plastic materials, an integral construction of the finished plastic frame results, and a gluing seam with its inherent disadvantages is avoided. Furthermore, it is especially advantageous that a separate and additional storage of plastic plates of different thickness and color can be avoided entirely. It is also advantageous that for manufacture of the center portion the same plastic blanks of a reduced thickness which are commonly used for the temples may be employed. The thickness of the blanks, for example, 4 mm, is thus uniform for both the center section and the temple portions of the plastic frame. The blanks of a reduced thickness have the further advantage of being less expensive. Furthermore, the storage of the plastic blanks is more economical especially because the delivery time for the 12 mm blanks made of cellulose acetate is commonly substantially greater than the delivery time for 4 mm blanks.

After the application of the formed portion, the plastic frame may then be subjected to the cutting or milling processes whereby the amount of discard material is reduced relative to plastic frames made from 12 mm blanks by at least 50%. Since the inventive method uses plastic blanks of a reduced thickness, the service life of the cutting machines is greatly increased, and the cutting process itself requires less time.

Preferably, the blank is comprised of a first cellulose acetate and the plastic material of the formed portion is comprised of a second cellulose acetate similar to the first cellulose acetate. It is especially preferred, that the formed portion and the blank are made of identical cellulose acetate.

According to another advantageous embodiment the step of applying the at least one formed portion includes the step of conforming the formed portion approximately to a desired shape of the protruding parts so that in the finishing step essentially only the blank must be finished, while the formed portion only requires a slight machining. When the injection molding process is carried out with respective care and true to form, then a subsequent machining or cutting may be obsolete.

It is especially advantageous that the inventive method may be easily converted to be performed in an automated manner. Expediently, the blanks are automatically transported to the injection head on a firm support on a conveyor belt and are then automatically transported away from the injection head after the completion of the injection molding process. It is especially expedient that a thickness of only 4 mm of the blank may still withstand the required injection molding pressure without causing deformations of the blank.

I t is possible to provide between the injection head and the cutting machine a blower alongside the conveyor belt for cooling down the blanks. With such a measure, i.e., the expedited cooling of the blanks, the manufacturing process may be accelerated. In any case, it is especially advantageous that drying times are entirely avoided.

It is also expedient that despite the use of inexpensive blank plates having a thickness of only 4 mm an integrally formed nose cushion with a great surface area may be provided whereby its thickness, respectively, width may exceed the commonly provided maximum width of 12 mm. Due to the selected materials, a transition between the plastic blank and the formed portion is invisible.

For the pretreatment of the plastic blank it is suggested to clean and degrease the surface of the blank. Preferably, the blank is pretreated with a solvent mixture before applying the formed portion by injection-molding or any other suitable process in order to achieve an intimate connection between the blank and the formed portion. It is expedient to use a solvent mixture comprised of 80 to 98% acetone, preferably, 92% acetone, and 20 to 2% ethylene glycol acetate, preferably, 8% ethylene glycol acetate, for this purpose. The acetone effects a sudden, short lived dissolving of the surface area, while the ethylene glycol acetate softens the surface area for an extended period of time and also homogenizes the material so that during the injection molding process the plastic material of the formed portion easily intermixes with the partially dissolved, tacky surface area of the plastic blank.

This pretreatment may be carried out such that the plastic blank is wiped with a sponge or rag which is saturated with a solvent. It is understood, however, that this wiping step may be performed on a conveyor belt with respective application rollers.

In a further embodiment of the present invention an additional stabilizing formed portion is provided at the blank for preventing tilting of the blank when positioned on edge to be introduced into a cutting machine, preferably, a fully automated CNC cutting machine with a respective feeding magazine, for performing the cutting step, whereby the stabilizing formed portion is removed from the plastic blank during the cutting step.

It is furthermore understood that the same method may also be used for manufacturing the temples of the plastic frame. Within the hinged area of the temples respective reinforcements or formed portions (hinge supports) may be applied so that the thickness of the plastic blank for the manufacture of the temples may be further reduced.

The method of the present invention essentially comprises the following steps: Cutting the plastic frame from a blank; before the cutting step, applying at least one formed portion of plastic material to the blank so as to coincide with the protruding parts of the plastic frame; and before the step of applying the formed portion, pretreating the blank for achieving an intimate connection between the formed portion and the blank. Preferably, the step of applying the formed portion includes the step of essentially homogeneously injection molding the plastic material onto the blank.

DESCRIPTION OF PREFERRED EMBODIMENTS

The present invention will now be described in detail with the aid of several specific embodiments utilizing FIGS. 1 through 6.

For the manufacture of a plastic frame for eyeglasses, the plastic blank 10 is first wiped with a solvent mixture consisting of 92% acetone and 8% ethylene glycol acetate. This ensures that the surface 12 is cleaned, degreased and also somewhat dissolved. The blank 10 is comprised of cellulose acetate as is conventional for plastic frames of eyeglasses.

In an injection molding process the parallelepipedal blank 10 is provided with four formed portions 14, 16, 18, and 20, as can be seen in FIG. 1. The formed portion 14 and 20 are selected with respect to their arrangement and embodiment such that they correspond to the required reinforcement or hinge support for a center portion of a plastic frame manufactured from the blank 10. The formed portions 16 and 18 are selected such that they correspond in their embodiment and arrangement to the nose cushion of the center portion of the plastic frame.

It is especially advantageous when the plastic material used for the injection molding step is compatible to the cellulose acetate of the blank, for example, it is expedient to select cellulose acetate for the formed portion.

An injection molding plastic material which corresponds especially well to the molecular composition of the plastic material of the blank is, for example, cellulose acetate of the type CA-SIC-wh-03451; manufactured by SIC MAZZUCCHELLI, Castiglione O., Italy.

In the shown embodiment the blank 10 has a thickness of 4 mm and the formed portions 14 to 20 are injection molded to have a height of 4 mm. Accordingly, the nose cushion of the finished plastic frame may have a width of up to 8 mm. It is understood that the desired thickness in other parts of the plastic frame may be adapted to the specific requirements.

Figure 2:
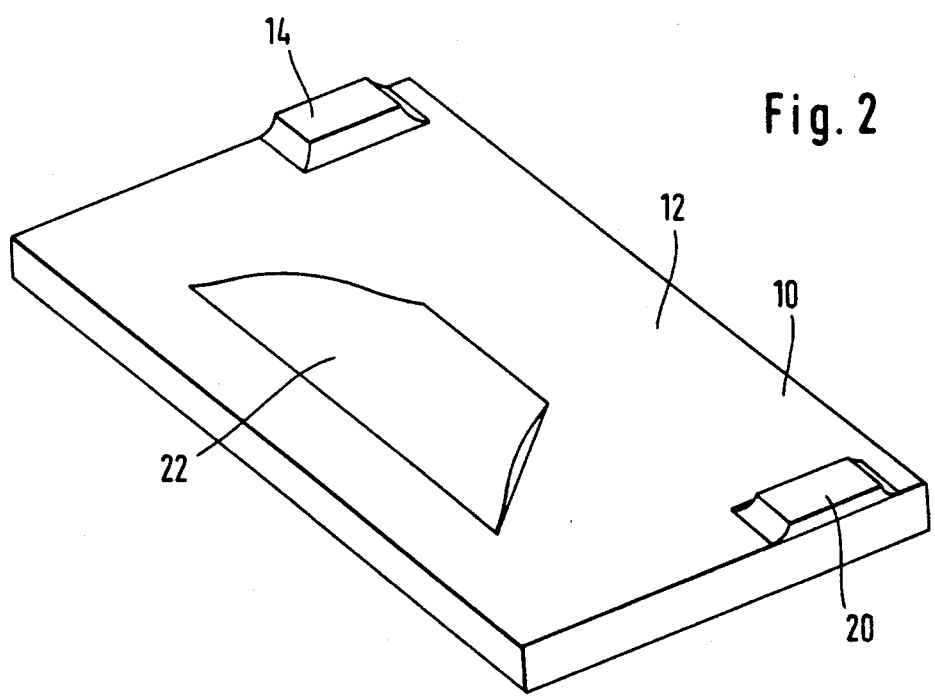
FIG. 2 is a further embodiment of the blank according to FIG. 1.

A further development of the applied formed portions may be seen in FIG. 2. The formed portions 16 and 18 of FIG. 1 in the embodiment of FIG. 2 are connected to one continuous formed portion 22 which covers the entire width of the nose cushioning area. Furthermore, the contour of the formed portion 22 is already adapted to the respective shaping of the nose cushion so that cutting steps for this particular shaping are no longer necessary.

Figure 3:
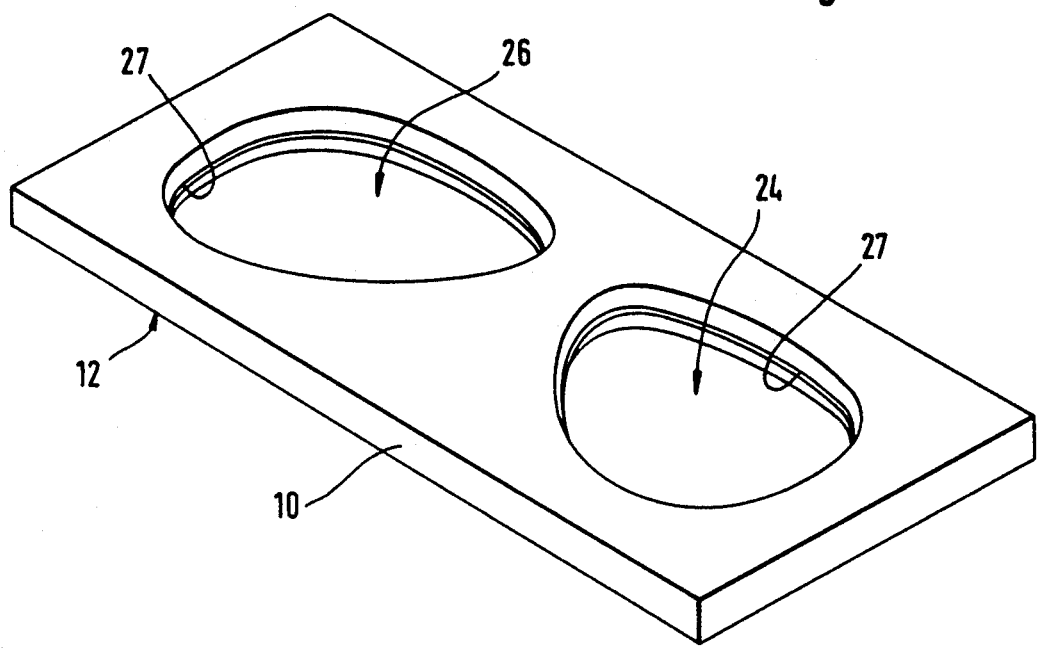
FIG. 3 is a perspective view of a center portion of an inventive plastic frame after the lens openings have been cut.

FIG. 3 demonstrates the forming of the lens openings 24 and 26 in a blank 10 according to FIGS. 1 or 2. The representation of FIG. 3 shows the blank 10 from its underside with respect to FIGS. 1 and 2 so that the formed portions 14 to 20 are invisible. Furthermore it can be taken from the drawing that the lens openings 24 and 26 are provided with a circumferential securing groove 27 which is required for securing the lenses to the plastic frame.

Figure 4:
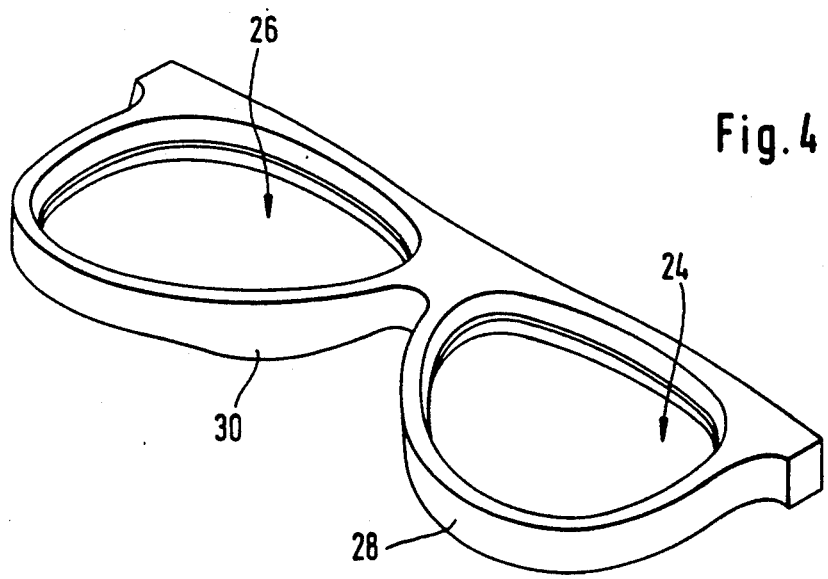
FIG. 4 is a perspective view of the plastic frame according to FIG. 3 after completion of the cutting process.

FIG. 4 shows a finished center portion 28 manufactured by cutting from the semi-finished product of FIG. 3. It is obvious that one of the nose cushions 30 is protruding from the plastic frame at a position where the formed portion 18 was applied.

Figure 5:
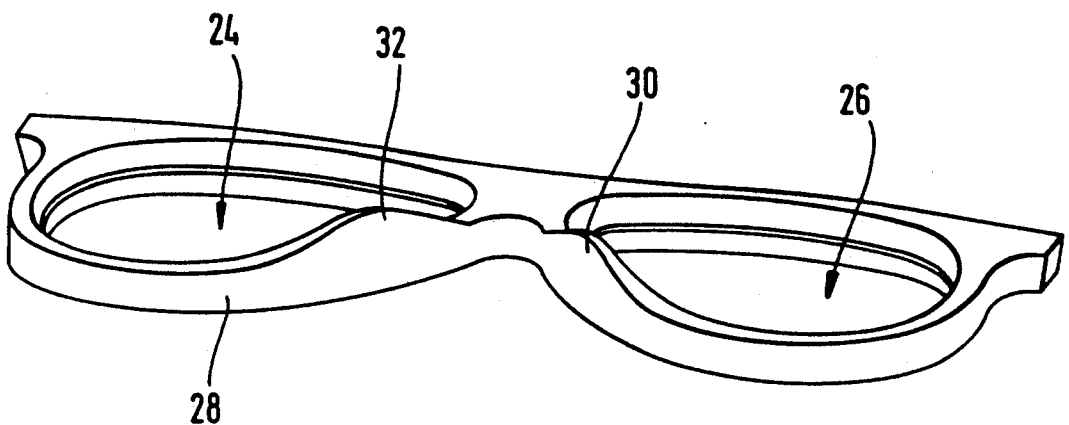
FIG. 5 is a view of the plastic frame according to FIG. 4 from a different angle.

FIG. 5 shows the center portion 28 of FIG. 4 in a different view. In FIG. 5 both nose cushions 30 and 32 are visible. The lateral contour of the nose cushions 30 and 32 correspond to the curved contour of the formed portion 22 of FIG. 2.

Figure 6:
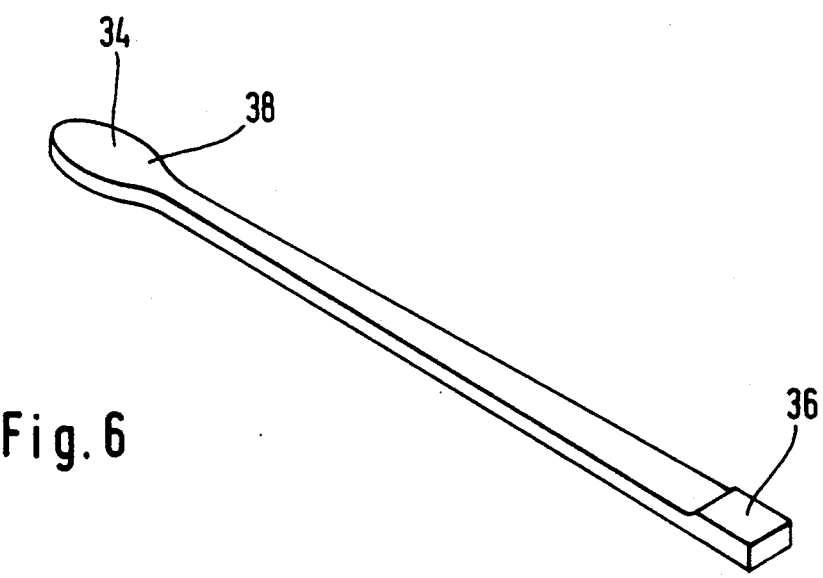
FIG. 6 is a perspective view of a temple manufactured according to the inventive method.

FIG. 6 shows a temple 34 which is manufactured from a blank having a thickness of 3 mm. Within the hinged area a formed portion ( hinge support ) 36 has been applied which increases the thickness of the temple 34 in this area to 4 mm. In a known manner the temple 34 tapers in a backward direction and forms an enlarged end portion 38.

It is understood that instead of the represented embodiments of the invention any other formed portion in a deliberately selected form may be injection molded to the blank. For example, the injection molding of the hinge support in the form of the formed portion 36 may be accomplished such that the formed portion 36 may be part of the tapered portion of the temple 34 in the direction toward the end portion 38 so that a further cutting step in this direction is obsolete. It is furthermore understood that instead of the afore explained injection molding process any other suitable application method may be used.

The present invention is, of course, in no way restricted to the specific disclosure of the specification and drawings, but also encompasses any modifications within the scope of the appended claims.

What I claim is:

1. A plastic frame for eyeglasses, comprising a center portion, temples and hinges for connecting said temples to said center portion, said plastic frame having protruding parts in the form of nose cushions at said center portion and hinge supports for said hinges at said center portion and said temples, said plastic frame manufactured by a process comprising the steps of:
   cutting said center portion and/or said temples from a plastic bank;
   before said step of cutting, applying at least one elevated formed portion of plastic material to the blank such that said formed portion exhibits an intimate connection to the blank, said step of applying comprising the step of positioning said at least one formed portion so as to coincide with said protruding parts of said plastic frame and essentially omogenously injection-molding said plastic material onto the blank; and
   finishing the blank together with said at least one formed portion to form said center portion and/or said temples.

2. A plastic frame according to claim 1, wherein said formed portion coincides with said nose cushions.

3. A plastic frame according to claim 1, wherein said formed portion coincides with said hinge supports.

4. A plastic frame according to claim 1, further comprising the steps of:
   making the blank for said center portion of plastic material used for said temples; and
   providing said blank for said center portion with a thickness corresponding to a thickness of said plastic frame without said protruding parts.

5. A plastic frame according to claim 1, wherein the blank is comprised of a first cellulose acetate and said plastic material of said formed portion is comprised of a second cellulose acetate similar to said first cellulose acetate.

6. A plastic frame according to claim 1, wherein said formed portion and the blank are made of identical cellulose acetate.

7. A plastic frame according to claim 1, further comprising the step of pretreating the blank with a solvent mixture, before said step of applying said at least one formed portion, for achieving said intimate connection between the blank and said formed portion.

8. A plastic frame according to claim 7, wherein said solvent mixture is comprised of 80 to 98% acetone and 20 to 2% ethylene glycol acetate.

9. A plastic frame according to claim 1, further comprising the step of providing an additional stabilizing formed portion to the blank for preventing tilting of the blank when positioned on edge to be introduced into a cutting machine for performing said cutting step, said stabilizing formed portion being removed by the cutting machine.

10. A plastic frame according to claim 9, wherein the cutting machine is of the CNC type.

11. A plastic frame according to claim 1, wherein said step of applying said at least one formed portion includes the step of conforming said formed portion approximately to a desired shape of said protruding parts so that in said finishing step essentially only the blank is finished.

* * * * *